United States Patent Office 3,074,823
Patented Jan. 22, 1963

3,074,823
METHOD FOR REMOVING COMPLEX SODIUM ALUMINUM SILICATE SCALE
Grover L. Dobbins, Baton Rouge, La., assignor to Kaiser Aluminum & Chemical Corporation, Oakland, Calif., a corporation of Delaware
No Drawing. Filed May 1, 1959, Ser. No. 810,256
4 Claims. (Cl. 134—18)

This invention relates to a wet method for removing scale from chemical processing apparatus. More particularly, this invention relates to a wet method for dissolving complex sodium aluminum silicate scale formations from apparatus employed in alkaline alumina refining processes.

The particular sodium aluminum silicate scale which the present invention is concerned with is not susceptible to positive identification by formulation. The scale is, however, well known to those familiar with Bayer type alkaline alumina refining operations. For example, the soda and alumina losses associated with Bayer type alumina refining operations are caused principally by the formation of the insoluble compounds, a portion of which deposits as scale formations on the walls of the conduits and apparatus employed for the processing treatments of the Bayer process.

The insoluble compound of the scale results as a direct consequence of the dissolution of the caustic soluble silica of the raw aluminous ores during the treatment thereof in the digestion step of the process. Characteristic analyses of the complex sodium aluminum silicate scale formations found in spent liquor evaporator tubes and spent liquor preheater tubes are shown below.

TABLE 1

| | Evaporator Tube Scale | Preheater Tube Scale |
|---|---|---|
| Percent L.O.I. (loss on ignition) | 5.75 | 6.39 |
| Percent $SiO_2$ | 34.59 | 33.88 |
| Percent $R_2O_3$ (R=Al, etc.) | 32.03 | 31.75 |
| Percent $Na_2O$ | 23.58 | 21.42 |
| Percent $CO_2$ | 2.59 | 1.96 |
| Total | 98.54 | 96.59 |
| Percent $Fe_2O_3$ | .14 | .54 |
| Percent $Al_2O_3$ (from $R_2O_3$) | 31.89 | 31.21 |

These scales which form, as for example, in Bayer type operations, are hydrated compounds containing soda, alumina, and silica values, and exhibit an inverted temperature solubility curve. This latter characteristic is responsible for excessive scale formations when silica containing caustic aluminate liquor is heated. Consequently, the scale problem is most aggravated by the conditions in the evaporators and heaters of the Bayer process because of the heated area presented, the scaling rate being proportional to the heated area as well as a function of the high temperatures which are found therein among other things.

The scale formations are major problems, particularly in Bayer plant operations, and must be removed at frequent intervals from the process equipment, in particular from the heat transfer equipment to maintain heat transfer coefficients.

A method commonly employed for removing the scale formations involves treating the scale with a dilute inhibited acid solution, and thereafter mechanically removing the scale by using tube reamers. This method is not satisfactory since the solution rate of the scale is exceedingly slow, even at elevated temperatures, manual labor is required, and equipment downtime is relatively high.

Furthermore, when an acid, such as inhibited sulfuric acid contacts the scale on the equipment surfaces, a slimy, jelly-like protective covering is formed immediately. This gelatinous coating appears to protect the unreacted underlying scale from the acid. Vigorous agitation of the acid has almost no effect on breaking this protective coating to permit a more rapid acid action.

Accordingly, this invention provides a wet method for removing complex sodium aluminum silicate scale from process equipment, and in particular, Bayer process equipment. Furthermore, this invention provides a method of descaling equipment as rapidly and as economically as possible with a minimum of damage to the equipment.

The method of scale removal according to this invention is most advantageous when employed for cleaning or descaling evaporator units and heat exchange apparatus. The invention will be described as exemplary with respect to these units, however, it will be apparent to those skilled in the art that the invention is not limited thereto. Still further, although the method of descaling is particularly directed to the scaling problem which arises in conventional Bayer type operations for the production of alumina by the alkaline extraction of aluminous values from alumina containing ores, it is likewise apparent that the invention is also applicable to other processes of the alkaline type employed for treating aluminous ores wherein similar scale formations take place.

The wet method for descaling or dissolving the complex sodium aluminum silicate scale according to this invention involves the addition of a surface active agent to dilute acid which increases the rate of solution of the scale. The usual slimy, jelly-like protective coating, referred to heretofore, does not form thereby and the scale remains in a granular unprotected condition which allows rapid acid action.

The surface active agent added to the dilute acid may be any of the various types of non-ionic, cationic, or anionic surface active agents. Particularly preferred is a non-ionic surface active agent of the general class of alkyl aryl polyether alcohols. An example of this type of surface active agent suitable for use is a commercially available one designated reagent X-100 marketed by the Rohm and Haas Corporation.

With respect to the inhibited dilute acid used in the descaling method, sulfuric acid is preferred, however, hydrochloric, or phosphoric acid is also suitable. An inhibitor is usually added to the acid to protect the metal surfaces of the process equipment from attack by the acid. A suitable acid inhibitor is Oakite No. 5 inhibitor which is a coal tar derivative.

With respect to the concentrations of the acid and surface active agent to be used in the descaling method, they are determined by the particular acid and wetting agent used. The acid should be dilute. A 10%–12.5% by volume inhibited sulphuric acid solution is suitable. A higher concentration than about 12.5% will possibly result in a solidification to a jelly consistency of the descaling solution if an excess of scale is present. No difficulty is encountered when the concentration of the acid is below about 12.5%. The surface active agent is added to the acid in amounts suitable to produce the required surface effect. Although the alkyl aryl polyether alcohols referred to are only slightly soluble in aqueous or dilute acid solutions, only a low concentration of the compound is required to produce the maximum surface effect, i.e., about one part of the agent to about 2,500 parts dilute sulfuric acid solution by volume being adequate.

Table No. 2 shows the results of descaling tests comparing data in which no surface active agent was used with data where a surface active agent was used. The tests were operated on a plant scale basis on the equipment indicated containing an excess of scale. In all the tests an inhibited sulfuric acid solution was used of the concentrations indicated as the initial percent $H_2SO_4$ (by volume). No surface active agent was added in tests 1–3. Rohm and Haas reagent X–100 was added in tests 4–6. No heat was added in any of the tests. The acid solution was circulated and agitated in the equipment to be descaled and the acid concentration was determined periodically as indicated. A constant decrease in acid concentration will be indicated due to solubilization and reaction of the acid with the scale. When two consecutive acid concentration determinations are the same, this indicates that there is no further acid action and that the equipment has been adequately descaled.

TABLE 2

*Results of Acid Cleaning Operations in the Plant*

| Test No. | Description of of Equipment Descaled | Dosage of Surface Active Agent (By Volume) | Percent $H_2SO_4$ (by volume) | | | | | | |
|---|---|---|---|---|---|---|---|---|---|
| | | | Initial | After 15 Mins. | After 30 Mins. | After 1 Hr. | After 2 Hrs. | After 3 Hrs. | After 6 Hrs. |
| 1 | Evaporator Unit | 0 | 12.6 | | | 10.5 | | | 8.1 |
| 2 | do | 0 | 12.0 | | | 8.3 | | 7.7 | |
| 3 | do | 0 | 10.2 | | | 7.5 | 7.0 | 6.8 | |
| 4 | do | 1:2500 | 11.2 | | | ² 0.90 | | | |
| 5 | Heat Exchanger | 1:2500 | 9.0 | 7.25 | 6.75 | 6.5 | ¹ 6.5 | | |
| 6 | Evaporator Unit | 1:2500 | 8.6 | | | 5.5 | ¹ 5.5 | | |

¹ Two consecutive acid concentrations which are the same indicate no further acid action and that the vessel has been adequately descaled.
² Another acid treatment required to insure complete removal of the scale because of the low concentration of the residual acid.

The results in Table 2 show that the acid containing the surface active agent reacts to a lower constant concentration level in a shorter period of time. The equipment was adequately descaled. This indicates an increase in solution rates of the sodium aluminum silicate scale when a surface active agent is used.

Where no surface active agent was added to the acid, a constant concentration level was not attained and indicated that the equipment was inadequately descaled.

In tests 4 and 5, the descaling operation was completed in two hours whereas in tests 1–3 even after 3 or 6 hours it would have been necessary to dump the acid and add another clean batch of acid to obtain an adequately descaled evaporator unit.

In test 4 the concentration of the acid reached 0.90 in one hour from an initial concentration of 11.2. This indicated that the scale formation was excessive and another acid treatment was required to insure complete removal of the scale.

Ordinarily in the practice of this invention, if the acid concentration is less than 2% at the end of about two hours, another acid treatment should follow. Complete removal of the scale is indicated if the acid concentration is greater than about 2% at the end of about two hours and if there is no further change in the acid concentration.

The practice of this invention in descaling operations results in a reduced down time for process equipment. Furthermore, since descaling is accomplished in a lesser period of time, there is less exposure of the equipment to corrosive conditions and no need for reaming operations which may damage the equipment.

What is claimed is:

1. A method for removing complex sodium aluminum silicate scale from apparatus employed in an alkaline process for alumina refining comprising dissolving said scale in a solution consisting essentially of about 10 to 12.5% by volume sulfuric acid, a small amount of a surface active agent and the balance water.

2. The method of claim 1 wherein said surface active agent is non-ionic.

3. The method of claim 2 wherein said non-ionic surface active agent is an alkyl aryl polyether alcohol.

4. A method for descaling indirect heat exchange apparatus employed in an alkaline alumina refining process, said apparatus containing adherent complex sodium aluminum silicate scale, comprising feeding a solution consisting essentially of about 10–12.5% by volume inhibited sulfuric acid, a non-ionic surface active agent, and the balance water to said apparatus, allowing said solution to react with and dissolve said scale in said apparatus, periodically determining the concentration of acid in said solution, and removing said solution from said apparatus when the concentration of acid in said solution decreases to a substantially constant value.

References Cited in the file of this patent

UNITED STATES PATENTS

| | | |
|---|---|---|
| 2,050,355 | McCollam et al. | Aug. 11, 1936 |
| 2,171,981 | Heimberger | Sept. 5, 1939 |
| 2,516,685 | Douty et al. | July 25, 1950 |
| 2,556,128 | Webb | June 5, 1951 |
| 2,629,696 | Dodd et al. | Feb. 24, 1953 |
| 2,692,188 | Chester | Oct. 19, 1954 |
| 2,940,837 | Acker | June 14, 1960 |